(12) United States Patent
Yano

(10) Patent No.: US 6,405,960 B2
(45) Date of Patent: Jun. 18, 2002

(54) SEAT BELT TENSION ADJUSTER

(75) Inventor: Hideaki Yano, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/755,196

(22) Filed: Jan. 8, 2001

(30) Foreign Application Priority Data

Jan. 17, 2000 (JP) .................................. 2000-007376

(51) Int. Cl.[7] .......................... B65H 75/48; B60P 22/34
(52) U.S. Cl. .................................................. 242/375.3
(58) Field of Search ........................... 242/375.1, 375.3; 280/807; 297/475, 476, 477, 478

(56) References Cited

U.S. PATENT DOCUMENTS

| 4,061,291 A | * | 12/1977 | Cunningham | ............ 242/375.3 |
| 4,301,977 A | * | 11/1981 | Yang | ................. 242/375.3 |
| 5,297,752 A | * | 3/1994 | Brown et al. | ............ 242/375.3 |
| 5,411,222 A | * | 5/1995 | Gray et al. | ............... 242/375.3 |
| 5,730,385 A | | 3/1998 | Kopetzky et al. | |
| 5,769,345 A | * | 6/1998 | Morner et al. | ........... 242/375.3 |
| 5,803,400 A | | 9/1998 | Kopetzky et al. | |

FOREIGN PATENT DOCUMENTS

JP          58-203772          11/1983

* cited by examiner

*Primary Examiner*—John M. Jillions
(74) *Attorney, Agent, or Firm*—Kanesaka & Takeuchi

(57) ABSTRACT

A seat belt tension adjuster adjusts tension on a seat belt wound on a reel by a biasing spring. The tension adjuster includes a biasing force adjusting mechanism situated between the reel and the spring for adjusting a biasing force transmitted from the spring to the reel depending on a rotational angular position of the reel. The biasing force adjusting mechanism includes a cam for gradually changing the biasing force based on the rotational angular position of the reel. The tension adjuster can freely set the withdrawing force and the winding force of the seat belt.

5 Claims, 2 Drawing Sheets

SEAT BELT TENSION ADJUSTER

BACKGROUND OF THE INVENTION AND RELATED ART STATEMENT

The present invention relates to a device for adjusting tension on a seat belt used in a vehicle or automobile, and more particularly, to a mechanical seat belt tension adjuster which can freely set the withdrawing force and the retracting force of the seat belt.

A normal seat belt system currently installed in an automobile has a tension spring employing a leaf spring. The leaf spring is formed in a spiral shape and has an inside end connected to a shaft of a reel for winding the seat belt and an outside end fixed to a housing of a seat belt retractor. The biasing force of the leaf spring exerts torque to the reel in a belt winding direction.

In the aforementioned seat belt retractor, the tension on the seat belt significantly varies with the withdrawn amount of the seat belt. For example, when the seat belt is fully wound up, the distortion of the leaf spring is the minimum and the biasing force is thus weak, so that the tension on the seat belt is thus small. On the other hand, when the seat belt is fully withdrawn, the distortion of the leaf spring is the maximum, the biasing force is thus strong, and the diameter of a circle formed by the seat belt wound on the reel is small. Thus, the tension on the seat belt is large. Due to the variation in the belt tension, the pressure by the seat belt increases against a large occupant to make the occupant uncomfortable. As conventionally pointed out, there is also a problem that the retractor sometimes can not wind up the seat belt completely.

It has been developed to provide a seat belt retractor which can exert a constant tension in spite of the withdrawn amount of the seat belt. For example, proposed by Japanese Unexamined Utility Model Publication No. 58-203772 is a mechanism of equalizing the biasing force of a spring by using cone pulleys. In this mechanism, the biasing force of the spring is amplified and is then transmitted to the reel in a position near the limit to which the seat belt is wound up. On the other hand, the biasing force of the spring is reduced and is then transmitted to the reel in a position near the limit to which the seat belt is withdrawn. In this manner, the tension on the seat belt can be constant in spite of the withdrawn amount of the seat belt.

Belt tension adjusting devices having cone pulleys just like the aforementioned publication are proposed by U.S. Pat. Nos. 5,730,385 and 5,803,400. Although these devices can equalize the biasing force, these devices can not freely set the tension on the seat belt. In addition, although these devices proposed by the patents have switches to change from a light mode to a heavy mode and vice versa, in which the tension values set in the respective modes are significantly different from each other, these devices can not smoothly adjust the magnitude of the tension between a small value and a large value.

In considering the aforementioned problem of the variation in a belt tension as the limit of the mechanical seat belt retractor, there is an idea that a reel for a seat belt is driven by a motor. In this case, the tension on the seat belt can be freely set because the torque of the motor can be freely controlled. Further, there is an idea that the rotational biasing force for the reel is amplified or reduced by using an electromagnet. However, the electric retractor requires a lot of parts as compared to the mechanical retractor using only one leaf spring. The electric retractor also requires wirings for transmitting electrical power and control signals.

The present invention has been made with reference to the aforementioned problems, and an object of the present invention is to provide a mechanical seat belt tension adjuster which can free set the withdrawing force and the winding force of the seat belt.

SUMMARY OF THE INVENTION

To solve the aforementioned problems, the present invention provides a seat belt tension adjuster for adjusting the tension on a seat belt used in a vehicle comprising: a reel on which the seat belt is wound; a spring for producing rotational biasing force to be imparted to the reel; and a biasing force adjusting mechanism arranged between the reel and the spring for adjusting the biasing force to be transmitted from the spring to the reel depending on the rotational angular position ω of the reel. The biasing force adjusting mechanism includes a cam for setting a biasing force adjusting ratio α to be an arbitrary function depending on the rotational angular position ω when the biasing force adjusting ratio α is Fo / Fx, i.e. Fo / Fr=α, wherein Fx is the input biasing force from the spring to the biasing force adjusting mechanism and Fo is the output biasing force from the biasing force adjusting mechanism to the reel.

Since the seat belt tension adjuster of the present invention has the cam for setting the biasing force adjusting ratio α to be an arbitrary function depending upon the rotational angular position ω of the reel, the tension (withdrawing force/winding force) of the seat belt can be freely set in spite of variation in the biasing force of the tension spring. Since a retractor of the present invention including the tension adjuster is of a mechanical type, parts including a motor for obtaining external power and wirings are not required.

In the seat belt tension adjuster of the present invention, the spring may be a leaf spring, one end of which is fixed. The biasing force adjusting mechanism comprises a slit plate having an input shaft, to which the other end of the leaf spring is fixed to a position apart from the center of the input shaft, and a slit extending in the radial direction; and a pin slidably situated in the slit. The cam is a cam plate having a cam groove in which the pin slides.

The biasing force adjusting ratio α can be freely set by suitably selecting the configuration of the cam groove of the cam plate. The seat belt retractor according to the present invention can be compact as compared to a conventional one having cone pulleys.

The seat belt tension adjuster of the present invention may further comprise a reduction gear mechanism arranged between the biasing force adjusting mechanism and the reel for reducing the rotation to be transmitted from the reel to the biasing force adjusting mechanism.

Because of the reduction gear mechanism, the moving amount of the leaf spring can be reduced. Accordingly, there is an advantage of reducing the load of the leaf spring.

DETAILED DESCRIPTION OF PREFERRED EMBODIMENTS

Figure 1:
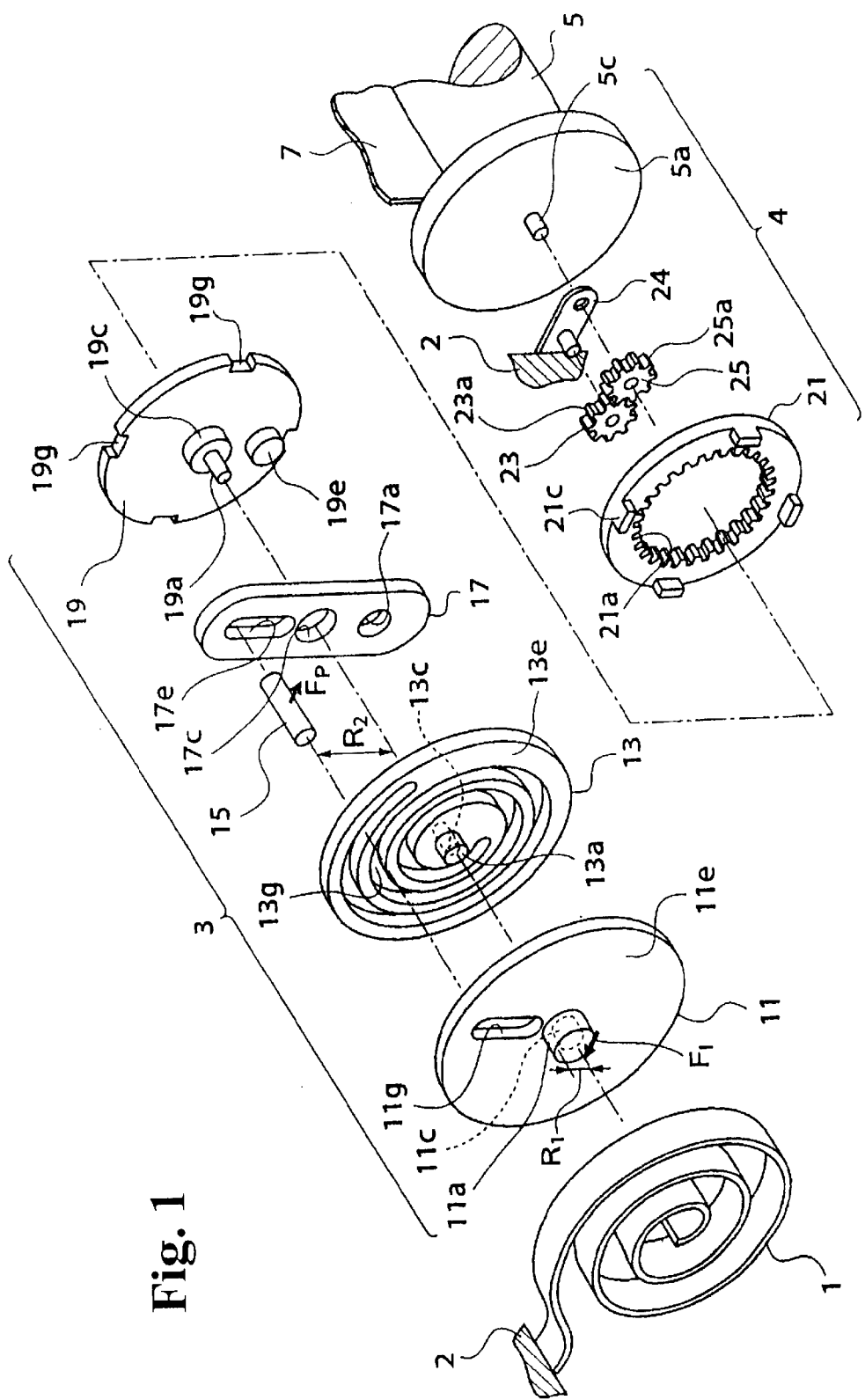
FIG. 1 is an exploded perspective view showing the structure of a seat belt tension adjuster according to one embodiment of the present invention.

Hereinafter, the description will be made with reference to the attached drawings. In the following description, directions including "right and left" means directions indicated in the drawings.

FIG. 1 is an exploded perspective view showing the structure of a seat belt tension adjuster according to an embodiment of the present invention. This seat belt tension adjuster comprises in a broad aspect the following main components:

(1) a leaf spring 1 for generating tension on a seat belt, (2) a biasing force adjusting mechanism 3 composed of a slit plate 11, a cam plate 13, a pin 15, and a lever 17, (3) a reduction gear mechanism 4 of a planetary gearing type, and (4) a reel 5 onto which the seat belt 7 is wound.

The leaf spring 1 is formed in a spiral shape and has an inside end connected to an input shaft 11a of the slit plate 11 of the biasing force adjusting mechanism 3 for winding up the seat belt. An outside end of the leaf spring 1 is fixed to a housing 2 of a seat belt retractor. The biasing force of the leaf spring 1 exerts torque to the reel 5 in a belt winding direction via the biasing force adjusting mechanism 3 and the reduction gear mechanism 4.

The slit plate 11 has a disk-like main body 11e. The main body 11e has the input shaft 11a which is formed to stand on the center of the main body 11e and to which the aforementioned spring 1 is connected. The input shaft 11a is provided at the core thereof with an axial hole 11c opening to the rear surface of the slit plate 11. Fitted in the axial hole 11c is a shaft 13a of the cam plate 13 described later. The slit plate 11 also has a slit 11g which extends in the radial direction. The slit 11g penetrates the main body 11e. The pin 15 described later is slidably fitted in the slit 11g.

The cam plate 13 has the disk-like main body 13e. The main body 13e has the shaft 13a which is formed to stand on the center of the main body 13e. The shaft 13a fits in the aforementioned axial hole 11c of the slit plate 11, and the slit plate 11 and the cam plate 13 are coaxial with each other to allow relative rotation with each other. The shaft 13a is provided at the core thereof with an axial hole 13c opening to the rear surface of the cam plate 13. Fitted in the axial hole 13c is a small shaft 19a of a base plate 19 described later. The cam plate 13 is formed with a spiral cam groove 13g. The cam groove 13g penetrates the main body 13e. The pin 15 described later is slidably fitted in the cam groove 13g.

The pin 15 is cylindrical. One end portion of the pin 15 is fitted in the slit 11g of the slit plate 11. A middle portion of the pin 15 is fitted in the cam groove 13g of the cam plate 13. The other end portion of the pin 15 is fitted in a slit 17e of the lever 17 described later. Depending on the fitting position of the pin 15 in the cam groove 13g, the position of the pin 15 in the radial direction apart from the rotation center of the cam plate 13 is defined. The biasing force adjusting ratio α can be obtained according to the radial position R2 of the pin 15. The biasing force adjusting ratio will be described in detail later.

The lever 17 is a substantially rectangular plate. The lever 17 is provided at the center thereof with an axial hole 17c which is formed to penetrate the lever 17. Fitted in the axial hole 17c is a large shaft 19c of the base plate 19 described later. The lever 17 is provided at an upper portion thereof with a slit 17e extending in the radial direction. The slit 17e penetrates the lever 17. The other end portion of the pin 15 slides in the slit 17e. The lever 17 is also provided at a lower portion thereof with a pin hole 17a which is formed to penetrate the lever 17. Fitted in the pin hole 17a is a pin 19e of the base plate 19 described later.

The base plate 19 is a circular plate. The base plate 19 has the large shaft 19c and the small shaft 19a which are formed to stand on the center of the base plate 19. The small shaft 19a is formed to stand on the large shaft 19c. The small shaft 19a is fitted in the axial hole 13c of the cam plate 13. The large shaft 19c is fitted in the axial hole 17c of the lever 17. The base plate 19 also has the pin 19e which is formed to stand on a lower portion in the drawing (left surface in the drawing) of the base plate 19. The pin 19e is fitted in the pin hole 17a of the lever 17. The base plate 19 is provided on the outer periphery thereof with four key grooves 19g equally spaced apart from each other at 90°. The key grooves 19g penetrate the base plate 19. Fitted in the key grooves 19g are keys 21c with an internal gear 21, respectively, as described later.

The internal gear 21 has a ring-like shape and internal teeth 21a formed on the inner periphery thereof. The internal teeth 21a mesh with external teeth 23a formed on a planetary gear 23 described later. The internal gear 21 is provided on the peripheral edge with the four keys 21c equally spaced apart from each other at 90°. These keys 21c are fitted in the key grooves 19g of the base member 19.

The planetary gear 23 has the external teeth 23a. The external teeth 23a mesh with the internal teeth 21a of the internal gear 21 and with external teeth 25a of a sun gear 25. An arm 24 which is fixed to the retractor housing 2 is held between the shaft center of the planetary gear 23 and the axis of the sun gear 25. The sun gear 25 has the external teeth 25a which mesh with the external teeth 23a of the planetary gear 23. The sun gear 25 is fixed to a shaft 5c which is formed to stand on an end surface of the reel 5.

The reel 5 has a drum portion onto which the seat belt 7 is wound. The reel 5 is provided at an end thereof with a flange 5a. The shaft 5c for fixing the sun gear 25 is formed on the center of the flange 5a.

The slit plate 11 and the cam plate 13 can rotate about the small shaft 19a of the base plate 19. The lever 17 can not rotate relative to the base plate 19 by the pin 19e. The pin 15 is fitted in the slit 11g of the slit plate 11, the cam groove 13g of the cam plate 13, and the slit 17e of the lever 17. As the lever 17 rotates according to the rotational angle of the reel 5, the pin 15 also moves according to the rotation of the lever 17. The slit plate 11 synchronizes with the lever 17 via the pin 15 to rotate together. At this time, the cam plate 13 takes a rotational position depending upon the engaging condition between the pin 15 and the cam groove 13g.

Hereinafter, description will now be made as regard to the biasing force adjusting ratio α of the seat belt tension adjuster.

First, the leaf spring 1 exerts a biasing force Fr to the shaft 11a of the slit plate 11. This force is transmitted to the pin 15 fitted in the slit 11g. The pin 15 transmits the force to the lever 17 and further transmits the force to the base plate 19 via the lever 17. Assuming that the current radial position of the pin 15 is R2, an equation $F \times R1 = Fp \times R2$ is obtained from the balance of torque. Accordingly, an equation $Fp = F \times (R1/R2)$ is obtained. That is, the force Fp transmitted from the pin 15 to the lever 17 varies depending on the radial position R2 of the pin 15. Here, R2 is defined by the configuration of the cam groove 13g of the cam plate 13 and the rotational angular position of the reel 5. Therefore, by suitably setting the configuration of the cam groove 13g of the cam plate 13, the force Fp transmitted from the pin 15 to the lever 17 can be freely set according to the rotational angular position ω of the reel.

The lever 17 is prevented from rotating relative to the base plate 19 by the pin 19e. Accordingly, the force transmitted from the pin 15 to the lever 17 is directly transmitted to the base plate 19. Therefore, the force transmitted to the base plate 19 can also be freely set according to the rotational angular position ω of the reel. In the same manner, the same force is transmitted to the internal gear 21 which is fixed to the base plate 19 by the keys.

Then, the force transmitted to the internal gear 21 is transmitted to the reel 5 via the reduction gear mechanism 4 composed of the planetary gear 23 and the sun gear 25. By adjusting the gear ratio of the reduction gear mechanism 4, the force transmitted from the base plate 19 to the reel 5 can be set optimally.

From the above description, the biasing force adjusting ratio α of the seat belt tension adjuster is defined by the radius R1 of the shaft 11a of the slit plate 11, the radial position R2 of the pin 15, and the gear ratio Rc of the reduction gear mechanism 4. Among them, the radius R1, the gear ratio Rc, and the radius R3 are inherent in the device and thus can be designed to obtain optimal biasing force. During the operation, these values do not vary.

On the other hand, the radial position R2 of the pin 15 varies during the operation of the device. Therefore, according to the variation of the R2 during the operation, the ratio α between the input biasing force Fx from the spring to the biasing force adjusting mechanism and the output biasing force Fo from the biasing force adjusting mechanism to the reel can be changed during the operation.

Figures 2A, 2B, 2C:
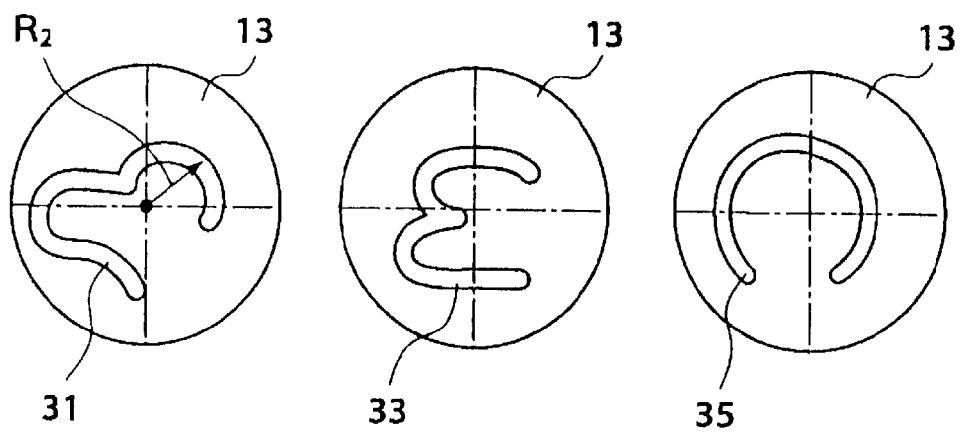
FIGS. 2(A)–2(C) are plan views showing various examples of the structures of the cam grooves formed in cam plates.

FIGS. 2(A)–2(C) are plan views showing various examples of the configurations of the cam grooves formed in the cam plate 13. These drawings are also seen as ω-R curves indicating the relation between the rotational angular position ω of the leaf spring 1 and the radial position R2 of the pin 15. By employing these various configurations of the cam grooves, the biasing force adjusting ratio α can be variously set.

The following description will be made as regard to the variation in the belt tension with reference to FIG. 3.

Figure 3:
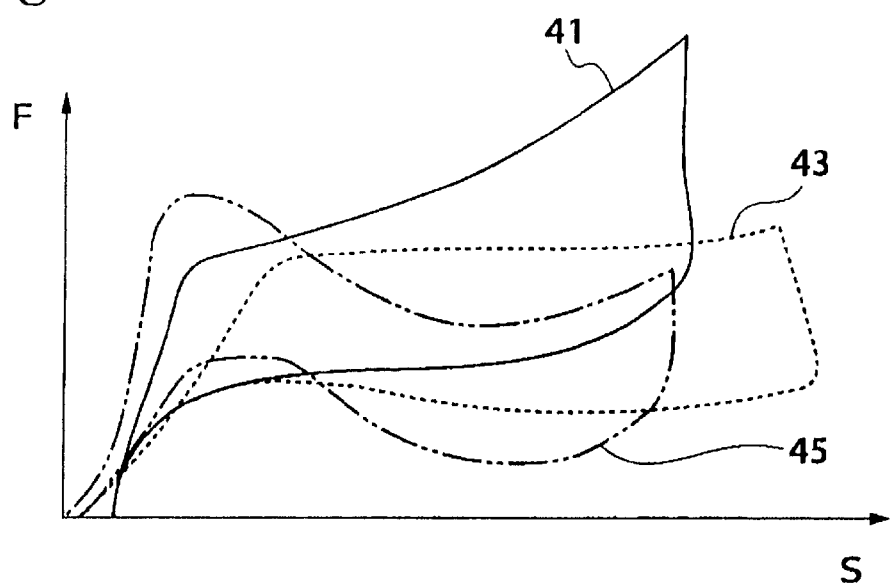
FIG. 3 is a graph of S-F curves indicating the relation between the withdrawn length "S" of the seat belt and the withdrawing force "F" thereof.

FIG. 3 is a graph of S-F curves indicating the relation between the withdrawn length "S" of the seat belt and the withdrawing force "F".

A case of a conventional seat belt is shown by a solid line 41. This curve shows that the input biasing force of the leaf spring 1 is increased as the seat belt is withdrawn.

Cases of the seat belt devices using the cam plate of the present invention are shown by dashed lines 43 and chain double-dashed lines 45. In these cases, even when the withdrawn length is increased, the withdrawing force is substantially constant. To obtain such results, it should be designed such that the radial position R2 of the pin 15 is gradually increased as the rotational angular position ω of the reel is increased. That is, by forming the groove to achieve such design, a desired withdrawing force can be obtained.

In the case shown by the chain double-dashed lines 45, unlike the conventional seat belt system, the withdrawing force (winding force) is greater at the initial stage of withdrawal (or final stage of winding) of the seat belt, is smaller at the middle stage, and is slightly greater at the final stage. Because of the greater force at the final stage of winding the seat belt, the withdrawn seat belt can be securely completely wound up. Therefore, the seat belt retractor has excellent retracting property. Because of the smaller force at the middle stage, excess force is not required for wearing the seat belt. Because of the greater force at the final stage, the seat belt can fit the occupant's body. Such results also can be obtained by designing the configuration of the cam groove to obtain the desired result.

Though the above description has been made as regard to the seat belt retractor according to the one embodiment of the present invention with reference to FIGS. 1–3, the present invention is not limited thereto. By adjusting the biasing force adjusting mechanism and the reduction gear mechanism, the belt tension can be freely set to fit the occupant's body (slender, stout, tall, short, etc.) and/or preference.

As apparent from the above description, according to the present invention, the tension (withdrawing force/winding force) of the seat belt can be freely set in spite of variation in the biasing force of the tension spring depending upon the rotational angular position ω of the reel. Since the retractor of the present invention is of a mechanical type, parts including a motor for obtaining external power and wirings are not required.

While the invention has been explained with reference to the specific embodiments of the invention, the explanation is illustrative and the invention is limited only by the appended claims.

What is claimed is:

1. A seat belt tension adjuster for adjusting tension on a seat belt wound on a reel by a biasing spring to be used in a vehicle, comprising:
a biasing force adjusting mechanism situated between the reel and the spring for adjusting a biasing force transmitted from the spring to the reel depending on a rotational angular position of the reel, said biasing force adjusting mechanism including a cam for setting a biasing force adjusting ratio to be an arbitrary function depending on the rotational angular portion to thereby gradually change the biasing force based on the rotational angular position of the reel; a slit plate having an input shaft to be connected to the spring and a first slit extending in a radial direction from the input shaft; a lever to be connected to the reel and having a second slit; and a pin; said cam being disposed between the slit plate and the lever and having a cam groove so that the pin is slidably situated in the first and second slits through the cam groove.

2. A seat belt tension adjuster according to claim 1, wherein said biasing force adjusting ratio is Fo / Fx, wherein Fx is an input biasing force from the spring to the biasing force adjusting mechanism and Fo is an output biasing force from the biasing force adjusting mechanism to the reel.

3. A seat belt tension adjuster according to claim 1, further comprising a base plate immovably attached to the lever, said slit plate and cam being slidable relative to the base plate.

4. A seat belt tension adjuster according to claim 3, further comprising a reduction gear mechanism to be arranged between the biasing force adjusting mechanism and the reel for reducing rotation transmitted from the reel to the biasing force adjusting mechanism.

5. A seat belt tension adjuster according to claim 4, wherein said base plate is fixed to the reduction gear mechanism.

* * * * *